3,368,986
CARBONYL-CONTAINING EPOXIDES
Carl G. Schwarzer, Walnut Creek, Calif., assignor to Shell Oil Company, New York, N.Y., a corporation of Delaware
No Drawing. Filed May 10, 1965, Ser. No. 454,706
7 Claims. (Cl. 260—2.5)

ABSTRACT OF THE DISCLOSURE

Preparation of novel epoxides by condensing a phenol with an unsaturated carbonyl compound under basic conditions and subsequently reacting said condensates with an epoxy-halo-substituted alkane.

---

This invention relates to novel epoxide resins and the cured products thereof. More particularly the invention relates to epoxides of base catalyzed reaction products of a phenol and an unsaturated carbonyl compound and their cured products.

Phenolic resins are well known resins prepared by reacting aldehydes and phenols in the presence of acid or basic catalysts. Depending on the type of catalyst used as well as proportions of reactants, the reaction products are resole type resins or polynuclear phenols. Resin products have also been prepared by further reaction of the resoles or polynuclear phenols with a halohydrin such as epichlorohydrin in an alkaline medium thereby forming the corresponding glycidyl ethers. These glycidyl ethers known heretofore have been limited to those having reactive hydroxyl and glycidyl ether groups for curing purposes and have contained no other functional groups unless relatively high cost and functionally substituted phenolic compounds are used in the preparation of such products which functional groups do not interfere with the acid or basic catalyzed phenolaldehyde reaction or the glycidyl ether preparation.

It is an object of the invention to prepare novel epoxide resins. It is a further object of the invention to prepare epoxide resins which contain significant amounts of carbonyl groups. It is also an object of the invention to provide novel epoxide resins which may be cured through epoxide and/or carbonyl groups thereby producing valuable polymers. These and other objects will become more apparent from the following description. There have now been discovered novel resins containing functional carbonyl groups in addition to the epoxide groups. The novel epoxides of this invention are those prepared by condensing an unsaturated carbonyl compound with a monohydric or polyhydric phenol in the presence of basic catalyst and thereafter reacting the resulting product with an epoxy-halo-substituted alkane in the presence of an alkaline medium. The resulting epoxides may then be cured to form valuable polymers and plastics.

The unsaturated carbonyls used to react with the phenols are unsaturated aliphatic aldehydes or ketones having from 3 to 10 carbon atoms. Suitable compounds include acrolein, methyl acrolein, ethyl acrolein, crotonaldehyde, alpha-hexenaldehyde, tiglic aldehyde, methyl vinyl ketone, ethyl vinyl ketone, etc. Acrolein is preferred because of its ease of reaction and availability.

Suitable phenols for reaction with the unsaturated aldehydes and ketones include mononuclear monohydric and polyhydric phenols of from 6 to about 10 carbon atoms such as phenol, o-, m- and p-cresol, p-methoxy phenol, ethyl phenols, xylenols, etc., catechol, resorcinol, hydroquinone, pyrogallol, phloroglucinol, etc., and polynuclear polyhydric phenols of from 12 to about 24 carbon atoms such as 2,4 - bis(2-hydroxybenzyl)phenol, 2,4 - bis(4-hydroxybenzyl)phenol, 2,6 - bis(2 - hydroxybenzyl)phenol, 2,6-bis(4-hydroxybenzyl)phenol, 2-(2-hydroxybenzyl) - 4-(4-hydroxybenzyl)phenol, 2-(4-hydroxybenzyl) - 4 - (2-hydroxybenzyl)phenol, 2-(2-hydroxybenzyl) - 6 - (4 - hydroxybenzyl)phenol, 2-(2-hydroxybenzyl)-6-(4-hydroxybenzyl)phenol, 1,1,2,2 - tetrakis(hydroxyphenyl)ethane, and especially the dihydroxy diphenyl alkanes such as bis-(4-hydroxyphenyl)methane, bis(4 - hydroxyphenyl)ethane, 2,2-bis(4-hydroxyphenyl)propane and 2,2-bis(4-hydroxyphenyl)butane, etc.

Basic catalysts suitable for the reaction are the alkali and alkaline earth metal hydroxides, alkali metal alcoholates, aluminum isopropoxide and nitrogen bases such as ammonia, ammonium hydroxide, amines, heterocyclic nitrogen bases, hydroxy alkyl amines, etc. The amounts of basic catalysts depend somewhat on the strength of the basic material used. Inorganic bases may be used from between about 0.1 and 5% by weight based on the total reactants while organic bases may be used up to about 10%.

The mole ratio of the unsaturated aldehyde or ketone and the phenol to be reacted is between about 1:10 and 10:1 and preferably between about 1:5 and 5:1 respectively. The reaction may be conducted in the presence of inert organic polar solvents such as ketones, ethers, amides, sulfones, sulfoxides, pyridene, etc.

The reaction temperature may be between about 40 to about 150° C. with the higher temperatures significantly reducing the reaction time. Pressures are not critical and may be atmospheric, sub-atmospheric or super-atmospheric.

It has been found that the carbonyl content of the phenol-unsaturated carbonyl reaction product varies somewhat depending on the length of time the reaction is allowed to proceed. More particularly, it has been found that the carbonyl content of the product is reduced and the molecular weight increased as the reaction continues past the point at which the reaction between the two original reactants (i.e. phenol and unsaturated carbonyl) is complete. Where carbonyl content of the final epoxide resin is not critical, termination of the precursor preparation reaction at a point to give maximum carbonyl content may not be necessary. However, where products having a higher carbonyl content are desired, it will be advantageous to terminate the phenol-unsaturated carbonyl reaction no later than the point at which all of the reactant originally present in a minor amount is reacted. For example, when phenol is present in excess, the point at which all of the acrolein has been reacted can be determined by conventional methods such as gas-liquid chromatography.

The products prepared by the above described reaction are fusible resins which contain hydroxyl groups, conjugated carbonyl groups, and phenolic acidic groups. These resins are orange solids at room temperature. Thus, the phenol-unsaturated carbonyl reaction products are unusual since generally the reaction between phenols and carbonylic compounds results in products containing no substantial residual carbonyl functionality due to the reactivity between phenolic hydroxyl groups and carbonyl groups under either acid or basic conditions.

The epoxides of this invention are prepared by reacting the above described phenol-unsaturated carbonyl product with an epoxy-halo-substituted alkane in the presence of an alkaline medium. The reaction proceeds without difficulty of interference of the carbonyl groups which remain intact. It is generally desirable to have a stoichiometric excess of the epoxy-halo-substituted alkane present in the reaction and thus the materials are preferably reacted in chemically equivalent ratios between about 1:4 and 1:8 of phenolic hydroxyl: epoxy group respectively. The desired alkalinity for the reaction is obtained by adding alkaline materials such as alkali and alkaline earth metal hydroxides, for example, sodium or potassium hydroxide to the reaction mixture. The alkaline material is preferably used in a stoichiometric amount and more preferably in slight stoichiometric excess (5–10%) based on the phenolic hydroxyl content. The reactants and basic materials may be combined in any convenient manner. The reaction temperature may be between about 50 and 150° C. with the pressures not being critical.

The epoxy-halo-substituted alkanes are those alkanes having a vic-epoxy group

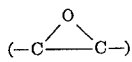

attached directly to a halogen bearing carbon atom. Typical compounds of this type include epichlorohydrin, epibromohydrin, 1,4-dichloro-2,3-epoxybutane, 1-chloro-2,3-epoxypentane, etc. Especially preferred are the epoxy-halo-substituted alkanes having from 3 to 8 carbon atoms.

The epoxides of the invention are resins varying in consistency from viscous liquids to solids. The products contain carbonyl groups in addition to the functional epoxy groups. The infrared spectroscopy of the phenolic-unsaturated carbonyl precursors and their epoxides shows an absorption at $5.9\mu$ and $6.28\mu$ thereby indicating the presence of a conjugated carbonyl, i.e., quinone structure. However, the exact structure of these products has not been determined.

The novel epoxide resins may be polymerized alone or with other polyepoxide materials such as glycidyl polyethers of polyhydric phenols obtained by reacting polyhydric phenols, such as bis-phenol A, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above described polyepoxides.

A great variety of different epoxy curing agents may be used in effecting the above described homo- and copolymerizations. Examples of the curing agents include, among others, alkalies like sodium or potassium hydroxide; alkali phenoxides like sodium phenoxide; carboxylic acids or anhydrides, such as phthalic anhydride, tetrahydrophthalic anhydride, Nadic methyl anhydride, chlorendic anhydride, pyromellitic anhydride, trimellitic anhydride, succinic anhydride, maleic anhydride, octadecenylsuccinic anhydride, etc. and mixtures thereof; dimer or trimer acids derived from unsaturated fatty acids, 1,20-eicosanedioic acid, and the like; Friedel-Crafts metal halides, such as aluminum chloride, zinc chloride, ferric chloride; or boron trifluoride as well as complexes thereof with ethers, acid anhydrides, ketones, diazonium salts, and those disclosed in U.S. 2,824,083; salts such as zinc fluoborate, magnesium perchlorate, zinc fluosilicate; phosphoric acid and partial esters thereof including n-butyl orthophosphate, diethyl ortho-phosphate and hexaethyltetraphosphate; aliphatic, aromatic and heterocyclic amino compounds, such as, for example, diethylene triamine, triethylene tetramine, tetraethylene pentamine, dicyandiamide, melamine, pyridine, cyclohexylamine, benzyldimethylamine, benzylamine, diethylaniline, triethanolamine, piperidine, tetramethylpiperzine, N,N-dibutyl-1,3-propane diamine, N,N-diethyl-1,3-propane diamine, 1,2-diamino-2-methylpropane, 2,3-diamino - 2 - methylbutane, 2,4-diamino-2-methylpentane, 2,4-diamino - 2,6 - diethyloctane, dibutylamine, dioctylamine, dinoylamine, distearylamine, diallylamine, dicyclohexylamine, methylethylamine, ethylcyclohexylamine, pyrrolidine, 2-methylpyrrolidine, tetrahydropyridine, 2,6-diaminopyridine, diamino-diphenylmethane, p,p′ - aminodiphenylsulfone, triaminobenzene, ortho-, para-, and metaphenylene diamine, methylene dianiline, diaminotoluene, diamino-diphenyl, diaminostilbene, 1,3-diamino-4-isopropyl benzene and the like, and soluble adducts of amines and polyepoxides and their salts, such as described in U.S. 2,651,589 and U.S. 2,640,037. Also included are the amino-amides obtained by reacting polybasic acids with polyamines such as described in U.S. Patents 2,450,940 and 2,695,908.

Preferred curing agents are the polycarboxylic acids and their anhydrides, the primary and secondary aliphatic, cycloaliphatic, aromatic and heterocyclic amines, and the polyamines and adducts of amines and epoxides.

In general, the amount of the curing agent will vary from about 0.5% to 200% by weight of the epoxy ether with the exact range depending on the type of agent and extent of cure. The tertiary amines and $BF_3$ complexes are preferably employed in amounts varying from about 0.5% to 20% and the metal salts are preferably employed in amounts varying from about 1% to 15%. The secondary and primary amines, acids and anhydrides are preferably employed in at least .6 equivalent, an equivalent amount being that sufficient to furnish one active hydrogen atom or carboxyl group or anhydride group for every epoxy group. Such combinations are preferably combined in equivalent ratios (curing agent to epoxy) which vary from about 0.6:1 to 1.5:1.

The curing of the above-described compositions to form the desired insoluble infusible products may be accomplished be merely mixing the above-noted curing agents in the desired amounts with the compositions of the present invention. The most active curing agents, such as the polyamines as diethylene triamine, are reactive at room temperature and application of heat is not necessary to effect the cure. Other agents, such as the aromatic polyamines are not quite as active at the lower temperatures and it is desirable to apply heat to speed the cure. Temperatures employed will vary from about 30° C. to as high or higher than 250° C.

The epoxide resins of the invention are unusual in that they are more reactive with epoxide curing agents and thus may be cured faster and at lower temperatures than other commonly known epoxide resins. In addition, the resins of the invention can be cured through the epoxide groups with hexamethylene tetramine, a reagent which is normally unreactive with epoxy resins.

As noted above, the resins in addition to curing through the epoxy groups may also be cured through their carbonyl groups. Thus, the carbonyl groups may be cross-linked with amines such as are used in curing the epoxide groups. Polyols such as glycerol, ethylene glycol, propylene glycol, trimethylene glycol, sorbitol, pentaerythritol, trimethylol propane, polyethylene glycols, polypropylene glycols, polybutylene glycols, etc. may be reacted with the carbonyl groups forming acetals or the carbonyl groups may be cross-linked with themselves in the presence of suitable catalysts. Alternatively, these carbonyl groups may be oxidized to form acid groups or hydrogenated to hydroxyl groups which may then be further reacted to produce desirable derivatives. Thus, it is readily evident that the novel products of this invention by virtue of their structure may be used for a variety of applications in which epoxides heretofore have not been used.

Where a common curing agent for both the epoxy and carbonyl groups is used such as an amine, it is generally necessary to have a stoichiometric excess of the curing agent necessary to react with the epoxy groups present since it has been found that the carbonyl groups are generally less reactive toward such curing agents than the epoxy groups.

The compositions of the invention may be utilized for a variety of applications. Because of their improved flexibility and impact resistance when cured, the compositions are ideally suited for use in preparing coating compositions foams, pottings, castings, adhesives, impregnating compositions for cloth and paper, and the like.

When used for coating compositions, the new compositions of the invention may be mixed with solvents or diluents, additives, such as plasticizers, stabilizers and extenders such as oils, resins, tars, pitches, distillates and the like, and then combined with the desired curing agent. The coatings prepared in this manner may be allowed to set hard at room temperature or heat may be applied to hasten the cure.

The products of the invention may also be used in preparing pottings and castings for electrical apparatus. In actual practice, the compositions are generally combined with the desired curing agent and the mixture poured into the mold or casting containing the electrical apparatus, such as electrical motors and the like, and the mixture allowed to set. Heat may also be applied to hasten cure.

As noted above, an unexpected property of the resins is that they can be cured with hexamethylene tetramine at elevated temperature. However, mixtures of these resins and the curing agent are stable at room temperatures and up to about 70° C. Thus a special advantage of the epoxide resins of the invention is that they may be mixed or compounded with the curing agent, for example, in the form of a molding powder and stored at normal temperatures. Such a composition may then be placed into molds and heated to form hard, infusible polymers as desired. This feature has generally been limited to resole and novolac resins heretofore.

The novel carbonyl-containing epoxide resins may also be employed to produce valuable foamed products. A particular advantage of these carbonyl-containing epoxides is that when the carbonyl groups are cured above 100° C. with an agent such as an amine, water is given off thereby producing a foam without the aid of the foaming agents that are normally necessary. The degree of foaming may also be controlled by varying the amount of curing agent used and the type of foam may be varied according to the curing temperature. The advantages of a product of this nature in simplifying a process for producing foam are obvious.

To illustrate the manner in which the invention may be carried out, the following examples are given. It is understood that the examples are for the purpose of illustration only and the invention is not to be regarded as limited to any of the specific conditions or compounds recited therein.

*Example I*

Phenol (470 g.) and solution of 6.6 g. of 85% potassium hydroxide in 10 cc. $H_2O$ were mixed in a reaction vessel under nitrogen at 180° C. After water was removed the mixture was cooled to 65° C. and 56 g. acrolein was added to give a mole ratio of phenol to acrolein of 5:1 with the temperature being maintained between 60 and 70° C. during the reaction. The reaction was stopped after about 90 minutes when gas-liquid chromatography showed the acrolein consumption to be complete. The catalyst was then neutralized with dilute HCl to a pH of 5.6. Excess phenol was distilled off at 120° C. at 25 mm. pressure. The product was a yellow solid weighing 107 g. The product in dilute benzene solution (200 ml. benzene) separated into two parts, one of which was benzene soluble and the other insoluble. The soluble and insoluble portions were separated and had the following analysis:

|  | Soluble, 50 g. | Insoluble, 57 g. |
| --- | --- | --- |
| Molecular weight | 198±8 | 300±15 |
| Carbonyl (equiv./100 g.) | 0.282 | 0.323 |
| Hydroxyl (equiv./100 g.) | 0.569 | 0.650 |

*Example II*

The procedure of Example I was repeated except that the reaction temperature was 100° C. Analysis showed the acrolein reaction was substantially complete after 41 minutes at which time the reaction was stopped. The product (121 g.) was separated into benzene soluble and benzene insoluble portions having the following analysis:

|  | Soluble, 58 g. | Insoluble, 63 g. |
| --- | --- | --- |
| Molecular weight | 210±8 | 315±15 |
| Carbonyl (equiv./100 g.) | 0.303 | 0.315 |
| Hydroxyl (equiv./100 g.) | 0.53 | 0.62 |

*Example III*

The procedure of Example I was repeated at a reaction temperature of 100° C. However, the reaction was allowed to proceed past the point at which the acrolein was used up. After about 90 minutes the reaction was stopped by neutralization of the catalyst. The product (121 g.) was treated with 200 ml. of benzene and the soluble and insoluble positions separated each giving the following analysis:

|  | Soluble, 63 g. | Insoluble, 58 g. |
| --- | --- | --- |
| Molecular weight | 305±12 | 550±35 |
| Carbonyl (equiv./100 g.) | 0.185 | 0.259 |
| Hydroxyl (equiv./100 g.) | 0.52 | 0.62 |

Example III shows that when the reaction is allowed to proceed past the time when the acrolein has been completely reacted (note Example II) there is a loss of carbonyl content in the product and a corresponding increase in molecular weight. Example II shows that an increase of the reaction temperature increases the rate of reaction but does not substantially affect the nature of the products (compare Example I).

*Example IV*

The procedure of Eaxmple I was repeated except that the catalyst concentration was doubled (13.2 g. 85% potassium hydroxide). The reaction temperature was between 60 and 70° C. and the acrolein was consummated after about 90 minutes at which time the reaction was terminated. The product weighing 104 g. was treated with 200 ml. benzene and the soluble and insoluble portions were separated and had the following analysis:

|  | Soluble, 54 g. | Insoluble, 60 g. |
| --- | --- | --- |
| Molecular weight | 260±10 | 375±15 |
| Carbonyl (equiv./100 g.) | 0.291 | 0.305 |
| Hydroxyl (equiv./100 g.) | 0.540 | 0.646 |

Example IV shows that when the catalyst concentration is increased the molecular weight of the product is slightly increased although the carbonyl content is substantially the same as that of Examples I and II.

*Example V*

To 122.5 g. of the benzene soluble composite of Examples I, II and IV (38.3 g., 43.5 g. and 40.7 g. respectively) prepared above (benzene removed) was added 900 g. epichlorohydrin and 170 ml. methanol. A solution of 30 g. sodium hydroxide in 35 ml. $H_2O$ was added to this mixture over a 15 minute period and the resulting composition refluxed for about ½ hour. The product resin was recovered by extraction with methyl isobutyl ketone as set forth above. 150 grams of the resin was recovered and had the following analysis:

| Epoxide (equiv./100 g.) | 0.360 |
| --- | --- |
| Carbonyl (equiv./100 g.) | 0.195 |
| Chlorine percent wt. | 0.39 |
| Molecular weight | 343±15 |

*Example VI*

A 135.9 g. composite of the benzene insoluble portions of the product of Examples I, II, and IV (42 g., 48.4 g., and 45.5 g. respectively) was reacted with 900 g. of epichlorohydrin according to the procedure described in Example V. The product had the following analysis:

Epoxide (equiv./100 g.) _____ 0.389
Carbonyl (equiv./100 g.) _____ 0.189
Chlorine percent wt. _____ 0.53
Molecular weight _____ 530±15 was mixed with 305 g. of hexamethylene tetramine and the mixture was cured at 150° C. for 2 hours. The resulting polymer was a hard, brittle resin. Hexamethylene tetramine (7.6 g.) was then mixed with 50 g. of EPON 828 (Shell Chemical Company) an epoxy resin having the formula

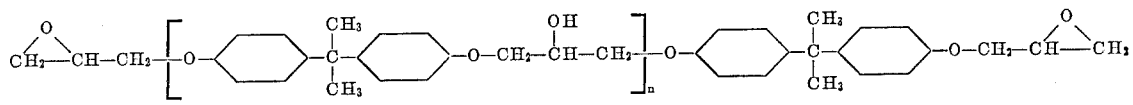

and an epoxide value of 0.52–0.55 equiv./100 parts of resin and an average molecular weight of 380. The mixture was cured at 150° C. for two hours after which time there was no evidence of curing.

*Example VII*

Phenol (2440 g.) and a solution of 33 g. 85% KOH in 50 g. H₂O were mixed and heated under nitrogen at 157° C. The water was removed and the solution cooled to 80° C. Acrolein (290 g.) was then added to provide about a 5:1 mole ratio with phenol, the reaction temperature being maintained at 80° C. for about 1 hour. The catalyst was neutralized with dilute HCl to a pH of 6–7. Excess phenol was removed by distillation. The product (596 g.) was dissolved in 1543 g. of epichlorohydrin and 400 ml. methanol. A solution of 128 sodium hydroxide in 150 g. H₂O were added and the reaction mixture refluxed for ½ hour after which time the volatiles were removed at 125° C. and 23 mm. pressure. The residue was dissolved in 1 liter methyl isobutyl ketone and filtered to remove salts. The solvent was removed by distillation. The product was a solid resin weighing 759 g. having the following analysis:

Epoxide (equiv./100 g.) _____ 0.340
Carbonyl (equiv./100 g.) _____ 0.216
Hydroxyl _____ .13
Chlorine _____ 0.59
Molecular weight _____ 425±15

*Example VIII*

2,2-bis(4-hydroxyphenyl)propane (234 g.) and acrolein (127 g.) were reacted according to the procedure of Example I. The amount of 85% potassium hydroxide catalyst used was 2.2 g. and the reaction was run in 500 ml. of dioxane at 90° C. for 40 minutes. The product weighed 256 g. and had the following analysis:

Carbonyl (equiv./100 g.) _____ 0.238
Phenolic hydroxyl (equiv./100 g.) _____ 0.71
Molecular weight _____ 350±10

This product (150 g.) was mixed with 1000 g. of epichlorohydrin in 300 g. methanol to which mixture a solution of 45 g. of sodium hydroxide in 48 g. of H₂O was added slowly over a period of 15 minutes. The reaction mixture was refluxed at 74° C. for ½ hour. The solvent was removed by distillation and the product was extracted with 500 ml. of methyl isobutyl ketone and filtered to remove salts. The solvent was removed and the resin product weighing 189 g. had the following analysis:

Epoxide (equiv./100 g.) _____ 0.410
Carbonyl (equiv./100 g.) _____ 0.116
Hydroxyl (equiv./100 g.) _____ 0.105
Molecular weight _____ 450±15

*Example IX*

The epoxide resin prepared in Example VII (50 g.)

*Example X*

90 parts by weight of the product of Example VII was mixed with 65 parts of Nadic methyl anhydride and 1 part of benzyldimethylamine promoter. The mixture was cured for 1 hour at 120° C. and 4 hours at 200° C. The hard, brittle product had a heat distortion point of 92° C.

*Example XI*

100 parts by weight of the epoxide resin prepared in Example VI was mixed with 10.2 parts of m-phenylenediamine and cured for 1 hour at 100° C. and 4 hours at 200° C. The resulting polymer was a dark brown solid having a Barcol hardness of 38 at room temperature.

This procedure was repeated using 15.2 parts of m-phenylene diamine per hundred parts of epoxide. The resulting product was a hard, low density foamed resin having high strength.

*Example XII*

The epoxide resin prepared in Example VIII (50 g.) was mixed with 5.6 g. of m-phenylenediamine and cured for 1 hour at 100° C. and 4 hours at 200° C. The resulting polymer casting had a heat distortion point of 160° C.

*Example XIII*

A mixture of the epoxide resin of Example VI and diethylene triamine (7.8 parts/100 parts resin) was heated to 50° C. The resin had a gel time of 4 minutes. By comparison, a mixture of EPON 828 and diethylene triamine (10.4 parts/100 parts resin) heated to 50° C. had a gel time of 27–30 minutes.

I claim as my invention:

1. A process for preparing a carbonyl-containing epoxide comprising reacting a phenol and an unsaturated aliphatic carbonyl of from 3 to 10 carbon atoms selected from the group consisting of aldehydes and ketones at a mole ratio of between about 1:10 and 10:1, respectively, at a temperature of between about 40 and 150° C. in the presence of a basic catalyst and reacting the product thereof with an epoxy-halo-substituted alkane of from 3 to 8 carbon atoms in the presence of an alkaline material.

2. The process of claim 1 wherein the phenol is selected from the group consisting of mononuclear, monohydric and polyhydric phenols of from 6 to about 10 carbon atoms and polynuclear polyhydric of from 12 to about 24 carbon atoms.

3. The process of claim 1 wherein the carbonyl is acrolein.

4. The process of claim 1 wherein the epoxy-halo-substituted alkane is epichlorohydrin.

5. The product obtainable by the process of claim 1.

6. The product obtainable by curing the product of claim 1 with an epoxy resin curing agent.

7. A process for preparing a foamed polymer which comprises reacting the product of claim 1 with an amine curing agent at a temperature above 100° C. said curing agent being present in an excess amount of that stoichiometrically necessary to cure the epoxide groups.

References Cited

UNITED STATES PATENTS

| | | | |
|---|---|---|---|
| 1,607,293 | 11/1926 | Moureu et al. | 260—55 |
| 2,458,408 | 1/1949 | Owens | 260—55 |
| 2,801,989 | 8/1957 | Farnham. | |
| 2,894,931 | 7/1959 | Somerville. | |

MURRAY TILLMAN, *Primary Examiner.*

JOHN C. BLEUTGE, *Assistant Examiner.*